Jan. 6, 1959 G. H. SNYDER 2,867,232
TANK FILLING SHUT-OFF VALVE
Filed Sept. 25, 1956 3 Sheets-Sheet 1

INVENTOR
George H. Snyder
BY Thomas W. J. Clark
ATTORNEY

Jan. 6, 1959  G. H. SNYDER  2,867,232
TANK FILLING SHUT-OFF VALVE
Filed Sept. 25, 1956  3 Sheets-Sheet 2

INVENTOR
George H. Snyder
BY Thomas W. J. Clark
ATTORNEY

Jan. 6, 1959 G. H. SNYDER 2,867,232
TANK FILLING SHUT-OFF VALVE
Filed Sept. 25, 1956 3 Sheets-Sheet 3

INVENTOR
George H. Snyder
BY
ATTORNEY 2,867,232

TANK FILLING SHUT-OFF VALVE

George H. Snyder, Baltimore, Md.

Application September 25, 1956, Serial No. 611,906

7 Claims. (Cl. 137—403)

This invention relates to a tank filling self-closing shut-off valve to be placed in the fuel duct of fuel tanks of locomotives, airplanes, boats and the like.

The principal object of the invention is to provide a valve which will close automatically when the tank is full and thus prevent the loss of fuel by overflow and the consequent fire hazard. To accomplish this purpose the valve is sensitive to the pressure within the tank and additional filling pressure on the fuel line will only close the valve itself tighter. Another object of the invention is to provide means to hold the valve open during the filling operation. Another object of the invention is to make the valve so rugged that it will require substantially no servicing over a long period of time.

Other objects and advantages of the invention will be apparent from the following description and the accompanying drawings forming a part hereof and in which:

Figure 4 is a fragmentary longitudinal sectional view showing the breather tube and its connections.

In the drawings similar numerals refer to similar parts through the several views.

Figure 1:
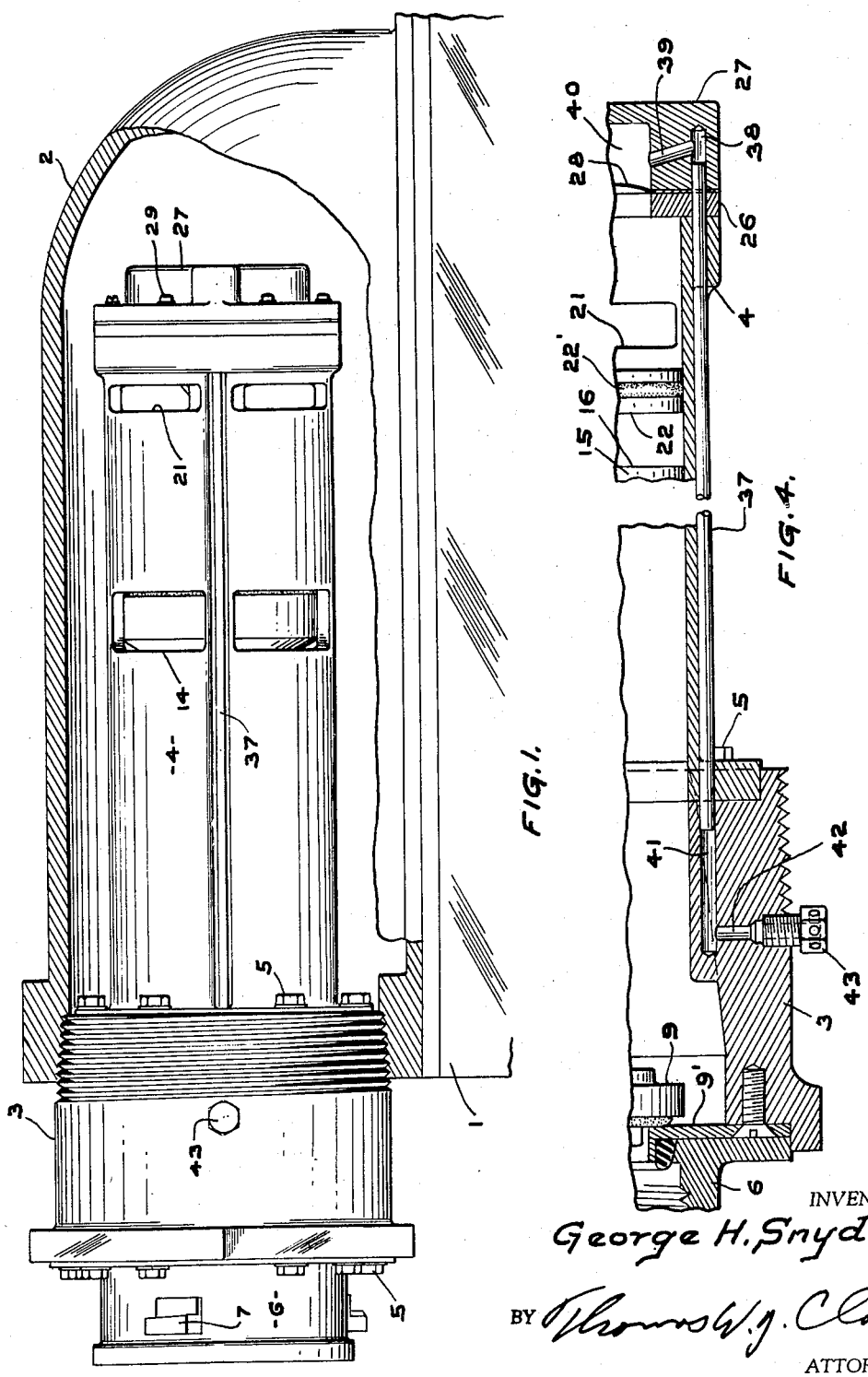
Figure 1 is a side elevational view of the valve with the fuel tank cowling or top being shown in section.
Figure 2:
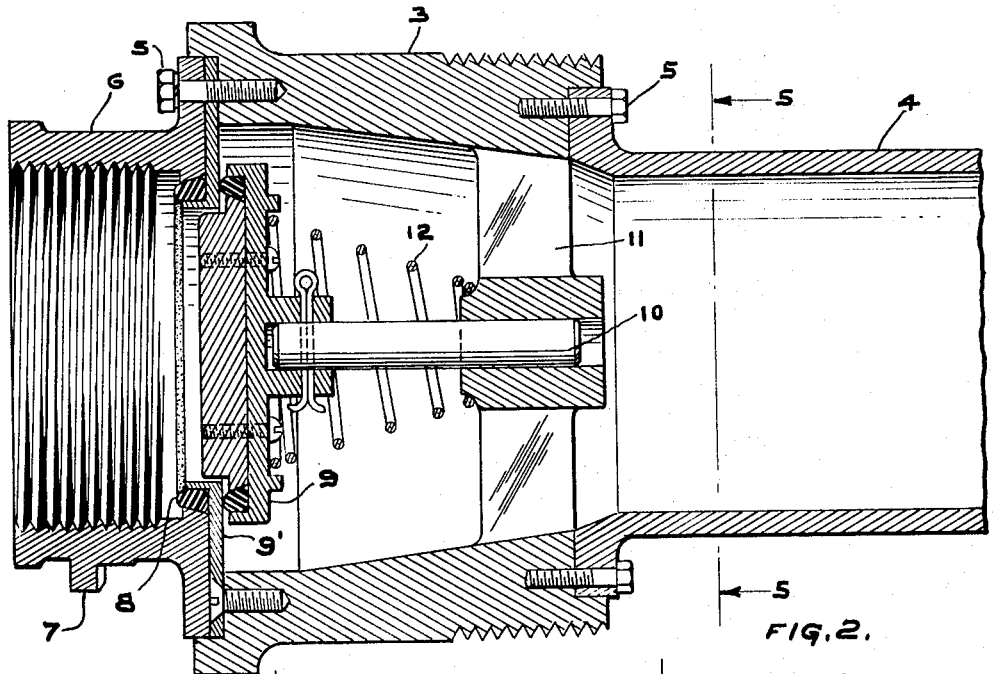
Figure 2 is a longitudinal sectional view of the forward end of the valve.
Figure 3:
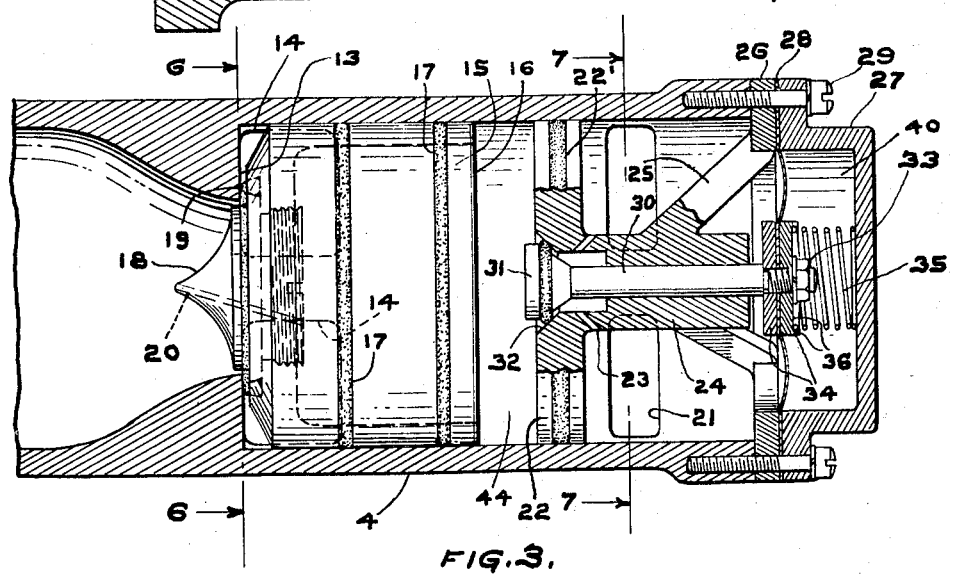
Figure 3 is a similar view of the rear end of the valve.
Figure 6:
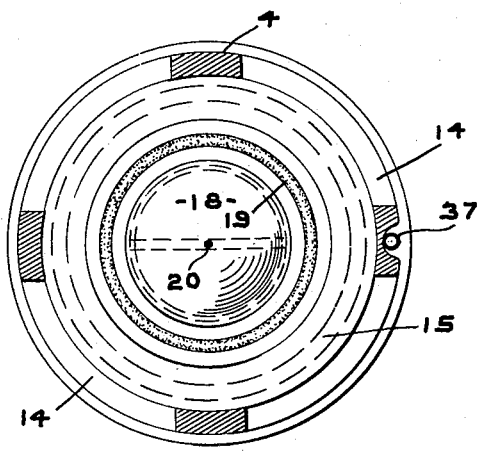
Figure 6 is a sectional view on line 6—6 of Figure 3.
Figure 7:
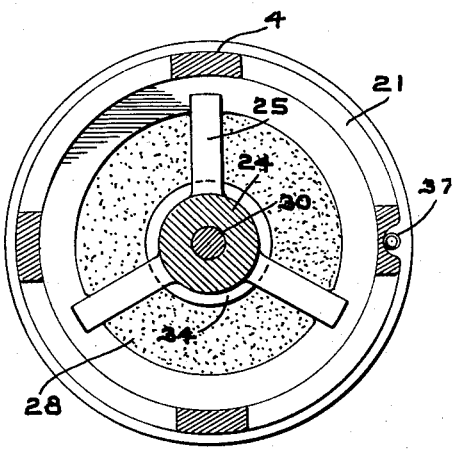
Figure 7 is a sectional view on line 7—7 of Figure 3.
Figure 5:
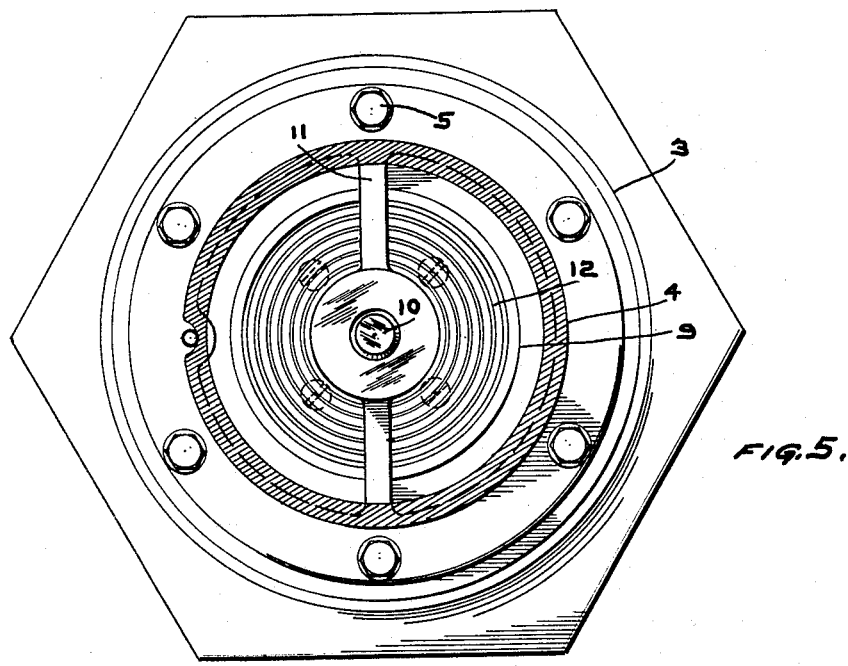
Figure 5 is a sectional view on line 5—5 of Figure 2.

The tank 1 has an upper portion or cowl 2 connected therewith into which the head 3 of the valve is screwed as shown in Figure 1. The valve tube 4 is attached to the head 3 by means of bolts 5. The head 3 has attached to its other end by similar bolts 5 the coupling 6 having lugs 7 thereon for the receipt of a tank filling nozzle such as that shown in applicant's copending application filed herewith. It is intended that the extreme end of the tank filling nozzle rest tightly against the face 8 of the connection and that the plunger or nozzle valve of the nozzle push open the valve 9 mounted on the shaft 10 slidable in the bearing in the spider 11.

In the head 3 this action would be resiliently withstood by the force of spring 12, so that upon the withdrawal of the plunger or nose valve of the tank filling nozzle the valve 9 would be closed automatically against its valve seat 9' thus preventing any outward flow or loss of fuel.

The valve tube 4 has a rearwardly directed valve seat 13 forward of which the tube is tapered inwardly, the seat constricting the opening. Substantially flush with this valve seat are the forward edges of the circumferential openings 14 in the valve tube 4. Piston 15 is slidable within the valve tube 4 back of the valve seat 13. The piston has a backwardly directed skirt 16 with gaskets 17 therein. Centrally in the forward end of the piston is screwed the conical deflector 18, closely fitting the taper of tube 4 and between the edges of the deflector and the forwardly projecting edge of the piston is a gasket 19 to seal the end of the piston in contact with the valve seat 13. The conical deflector 18 has an orifice 20 therethrough which is at the peak of the cone and passes diagonally back through the body of the deflector as shown. The valve tube 4 has other openings 21 circumferentially thereof and spaced back from the cylinder skirt 16 and immediately forward of these other openings 21 is the disk 22 with a gasket 22' in its edge to seal the edge with the inside of the valve tube 4. This disk 22 is mounted on the stem 24 held by spider 25 to ring 26 between which and end cap 27 is a flexible diaphragm 28. Both the end cap and ring 26 with the diaphragm are mounted on the end of valve tube 4 by screws 29. Stem 24 has an opening therethrough serving as a bearing for the shaft 30 of the valve 31 which rests upon valve seat 32 in disk 22. Stem 24 has angularly directed openings 23 beneath the valve seat 32, permitting fuel to flow through the valve to the tank, through openings 21. The other end of shaft 30 has mounted thereon by nut 33 washers 34 between which the diaphragm is held at its center. A spring 35 rests in end washer 34 which is cupped at 36 to hold the spring in place. The normal action of the spring 34 is to hold the valve 31 off its seat 32. The diagonal direction of orifice 20 keeps the fuel active and valve seat 32 clean.

A breather tube 37 extends into opening 38 in end cap 27 having a connecting passage 39 with the chamber 40 between the diaphragm 28 and end cap 27. At the other end the breather tube 37 passes into opening 41 in head 3 connected with opening 42 having breather cap 43 therein, this breather cap being outside the tank cover 2 so that chamber 40 is under atmospheric pressure.

Fuel tanks such as that shown at 1 generally have an overflow near their top and when the tank is filled to the overflow pipe the fluid will tend to rise therein and the fuel pressure exerted on the diaphragm 28 will close the valve 31 and make the chamber 44 back of the piston 15 and in front of the disk 22 tight. Fuel will continue to enter the passage between the piston 15 and its valve seat until the piston is pushed against the seat by the build up of pressure within the chamber 44 and this build up is caused by the entry of the fluid within the orifice or passage 20 of the deflector 18 and because of the larger face on the end surface of the piston in the chamber 44 than on the nose of the deflector, subject to the pressure of the flow from the constricted opening forward of the valve seat, the pressure will continue to build up within the chamber 44 until the valve closes tightly. The valve then continues closed, until the pressure within the tank is relieved and the spring 35 opens the valve 31 which permits the fuel to flow therethrough. The piston is then again ready to be forced back by the inflow of the fuel upon the next filling of the tank.

While the preferred embodiment of the invention has been illustrated and described in detail, obvious modifications will occur to those skilled in the art, therefore it is not desired that the invention be limited to the exact details shown and described as the scope of the invention is best defined in the following claims.

What is claimed as new and is desired to be secured by Letters Patent is:

1. A tank filling shut-off valve adapted to be mounted in a tank to be filled comprising a tubular walled body having an opening in the forward end for the admission of liquid thereinto, a rearwardly facing valve seat on the inner wall intermediate the ends of the tubular body, the wall of the body having circumferential liquid discharge openings therethrough immediately to the rear of the valve seat, a piston slidable in the body having a portion to contact said seat and close said circumferential openings and means in said body including the piston to direct the flow of liquid beyond the piston to move the valve to closing position when the tank to which the valve is connected is filled.

2. A tank filling shut-off valve adapted to be mounted in a tank to be filled comprising a tubular walled body having an opening in the forward end for the admission of liquid thereinto, a rearwardly facing valve seat on the inner wall intermediate the ends of the tubular body, the wall of the body having circumferential liquid discharge openings therethrough immediately to the rear of the valve seat, a piston slidable in the body having a portion to contact said seat and close said circumferential openings, the body having other openings therein to the rear of said piston to form a passage for liquid to and from the tank being filled to the rear of the piston, and means in said body including the piston to block the flow of liquid from the tank to the rear of the piston and to direct the flow of liquid beyond the piston to move the valve to closing position when the tank to which the valve is connected is filled.

3. A tank filling shut-off valve adapted to be mounted in a tank to be filled comprising a tubular walled body having an opening in the forward end for the admission of liquid thereinto, a rearwardly facing valve seat on the inner wall intermediate the ends of the tubular body, the wall of the body having circumferential openings therethrough immediately to the rear of the valve seat, a piston slidable in the body having a portion to contact said seat and close said circumferential liquid discharge openings, the body having other openings therein to the rear of said piston to form a passage for liquid to and from the tank being filled to the rear of the piston, the piston having an opening therethrough for the passage of liquid therethrough, valve means between the piston and said other openings and means sensitive to pressure caused by the filling of the tank to which the valve is connected directing the flow of fluid to close the valve means and valve when the tank is filled, liquid being directed through the piston opening to effect the final piston closing.

4. A tank filling shut-off valve adapted to be mounted in a tank to be filled comprising a tubular walled body having an opening in the forward end for the admission of liquid thereinto, a rearwardly facing valve seat on the inner wall intermediate the ends of the tubular body, the wall of the body having circumferential openings therethrough immediately to the rear of the valve seat, a piston slidable in the body having a portion to contact said seat and close said circumferential openings, the body having other openings therein to the rear of said piston to form a passage for liquid to and from the tank being filled to the rear of the piston, the piston having a conical deflector on the forward end thereof centrally of the piston and valve seat and the piston and deflector having an opening therethrough axially of the deflector at its conical tip, and means sensitive to pressure caused by the filling of the tank to which the valve is connected to direct the flow of fluid to close the valve means and valve when the tank is filled, liquid being directed through the piston and deflector opening to effect the final piston closing.

5. A tank filling shut-off valve adapted to be mounted in a tank to be filled comprising a tubular walled body having an opening in the forward end for the admission of liquid thereinto, a rearwardly facing valve seat on the inner wall intermediate the ends of the tubular body, the wall of the body having circumferential openings therethrough immediately to the rear of the valve seat, a piston slidable in the body having a portion to contact said seat and close said circumferential openings, the body having other openings therein to the rear of said piston to form a passage for liquid to and from the tank being filled to the rear of the piston, the piston having an opening therethrough for the passage of liquid, valve means between the piston and said other openings to control the flow of liquid to the rear of the piston through said other openings, a pressure responsive diaphragm connected to said valve means to close the same, means to maintain said valve means normally open, the diaphragm being sensitive to pressure caused by the filling of the tank to which the valve is connected to close the valve means when the tank is filled, the opening in the piston directing the liquid through the piston opening to effect the final piston closing after the closing of the valve means.

6. A tank filling shut-off valve adapted to be mounted in a tank to be filled comprising a tubular walled body having an opening in the forward end for the admission of liquid thereinto, a rearwardly facing valve seat on the inner wall intermediate the ends of the tubular body, the wall of the body having circumferential openings therethrough immediately to the rear of the valve seat, a piston slidable in the body having a portion to contact said seat and close said circumferential openings, the body having other openings therein to the rear of said piston forming a passage for liquid to and from the tank being filled to the rear of the piston, the piston having a conical deflector on the forward end thereof centrally of the piston and valve seat and the deflector and piston having an orifice therethrough axially of the deflector at its conical tip, a disk within the body between said other openings and piston and a secondary valve within said disk having a diaphragm connected thereto to close the valve upon pressure from the tank in which the valve is mounted on one side thereof and means connected to the other side of the diaphragm to vent the pressure thereon to the atmosphere without the tank, the orifice in the deflector and piston directing the liquid through the deflector and piston to effect final piston closing after closing of the secondary valve.

7. A tank filling shut-off valve adapted to be mounted in a tank to be filled comprising a tubular walled body having an opening in the forward end for the admission of liquid thereinto, a rearwardly facing valve seat on the inner wall intermediate the ends of the tubular body, the wall of the body having circumferential liquid discharge openings therethrough immediately to the rear of the valve seat, a piston slidable in the body having a portion to contact said seat and close said circumferential openings, the body having other openings therein to the rear of said piston forming a passage for liquid to and from the tank being filled to the rear of the piston, the piston having an orifice therethrough, and the valve seat constricting the tubular walled body opening against the piston end to a smaller area than that of the rear of the piston subject to liquid pressure, means to close the passage from the tank being filled to the rear of the piston, whereby the continued pressure of liquid back of the piston through the piston orifice forces the piston closed.

References Cited in the file of this patent

UNITED STATES PATENTS 2,620,818    Symmons  ---------------- Dec. 9, 1952